US012763687B2

(12) United States Patent
Chen

(10) Patent No.: US 12,763,687 B2
(45) Date of Patent: Oct. 13, 2026

(54) MULTI-OUTPUT POWER CONVERTER HAVING SINGLE INDUCTOR

(71) Applicant: ANPEC ELECTRONICS CORPORATION, Hsinchu (TW)

(72) Inventor: Fu-Chuan Chen, Hsinchu City (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 150 days.

(21) Appl. No.: 18/801,559

(22) Filed: Aug. 12, 2024

(65) Prior Publication Data

US 2025/0373161 A1 Dec. 4, 2025

(30) Foreign Application Priority Data

May 29, 2024 (TW) ................................ 113119760

(51) Int. Cl.
*H02M 3/158* (2006.01)

(52) U.S. Cl.
CPC .................................. *H02M 3/158* (2013.01)

(58) Field of Classification Search
CPC .... H02M 3/158; H02M 3/155; H02M 3/1552; H02M 3/1555; H02M 3/1557; H02M 3/156; H02M 3/1563; H02M 3/1566; H02M 3/157; H02M 3/1582; H02M 3/1584; H02M 3/1586
See application file for complete search history.

(56) References Cited

U.S. PATENT DOCUMENTS

| | | | | |
|---|---|---|---|---|
| 10,056,837 | B2 * | 8/2018 | Toyama | H02M 3/158 |
| 2010/0253309 | A1 * | 10/2010 | Xi | H02M 3/156 323/288 |
| 2011/0169468 | A1 * | 7/2011 | Wu | H02M 3/157 323/282 |
| 2020/0127561 | A1 * | 4/2020 | Takada | H02M 3/156 |
| 2021/0006160 | A1 * | 1/2021 | Wu | H02M 3/158 |
| 2021/0326691 | A1 * | 10/2021 | Liu | G06N 3/08 |

* cited by examiner

*Primary Examiner* — Nguyen Tran
(74) *Attorney, Agent, or Firm* — Li & Cai Intellectual Property Office

(57) ABSTRACT

A multi-output power converter having a single inductor is provided. The multi-output power converter includes a high-side switch, a low-side switch, a control circuit, a plurality of output switches and a signal duty distributing circuit. A node between a first terminal of the low-side switch and a second terminal of the high-side switch is connected to a first terminal of the inductor. A first terminal of each of the plurality of output switches is connected to a second terminal of the inductor. The signal duty distributing circuit sets duty cycles of a plurality of waveforms of a plurality of switching signals, according to output voltages respectively from second terminals of the plurality of output switches. The signal duty distributing circuit outputs the plurality of switching signals respectively to control terminals of the plurality of output switches.

13 Claims, 8 Drawing Sheets

MULTI-OUTPUT POWER CONVERTER HAVING SINGLE INDUCTOR

CROSS-REFERENCE TO RELATED PATENT APPLICATION

This application claims the benefit of priority to Taiwan Patent Application No. 113119760, filed on May 29, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power converter, and more particularly to a multi-output power converter having a single inductor.

BACKGROUND OF THE DISCLOSURE

Power converters are indispensable for electronic devices. The power converters are used to adjust power and supply the adjusted power to the electronic devices. However, each of the power converters only has a single output terminal as a single output channel, and each of the power converters is only connected to a single load through the single output terminal. Under this condition, one of the power converters only supplies one output current to the single load through the single output terminal of the power converter. If different amounts of power are respectively required for a plurality of loads, the plurality of power converters must be respectively connected to the plurality of loads, and the number of the power converters must be increased with the number of the loads. As a result, these power converters occupy a large space, and relevant costs are significantly increased.

SUMMARY OF THE DISCLOSURE

In response to the above-referenced technical inadequacies, the present disclosure provides a multi-output power converter having a single inductor. The multi-output power converter has a high-side switch, a low-side switch, a control circuit, a plurality of output switches and a signal duty distributing circuit. A first terminal of the high-side switch is coupled with an input voltage. A first terminal of the low-side switch is connected to a second terminal of the high-side switch. A second terminal of the low-side switch is grounded. A node between the first terminal of the low-side switch and the second terminal of the high-side switch is connected to a first terminal of the inductor. The control circuit is connected to a control terminal of the high-side switch and a control terminal of the low-side switch. The control circuit is configured to control the high-side switch and the low-side switch. A first terminal of each of the plurality of output switches is connected to a second terminal of the inductor. The signal duty distributing circuit is connected to a second terminal and a control terminal of each of the plurality of output switches. The signal duty distributing circuit sets duty cycles of a plurality of waveforms of a plurality of switching signals, according to a plurality of output voltages respectively from the second terminals of the plurality of output switches. The signal duty distributing circuit outputs the plurality of switching signals respectively to the control terminals of the plurality of output switches.

As described above, the present disclosure provides the multi-output power converter. The multi-output power converter of the present disclosure includes the plurality of output terminals that are connected respectively to the plurality of loads. In the multi-output power converter of the present disclosure, the signal duty distributing circuit appropriately distributes the duty cycles of the plurality of switching signals outputted to the plurality of output switches. Therefore, even if only the single inductor is disposed, the multi-output power converter of the present disclosure effectively achieves an effect of supplying different amounts of power to the plurality of loads without greatly expanding circuit components.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
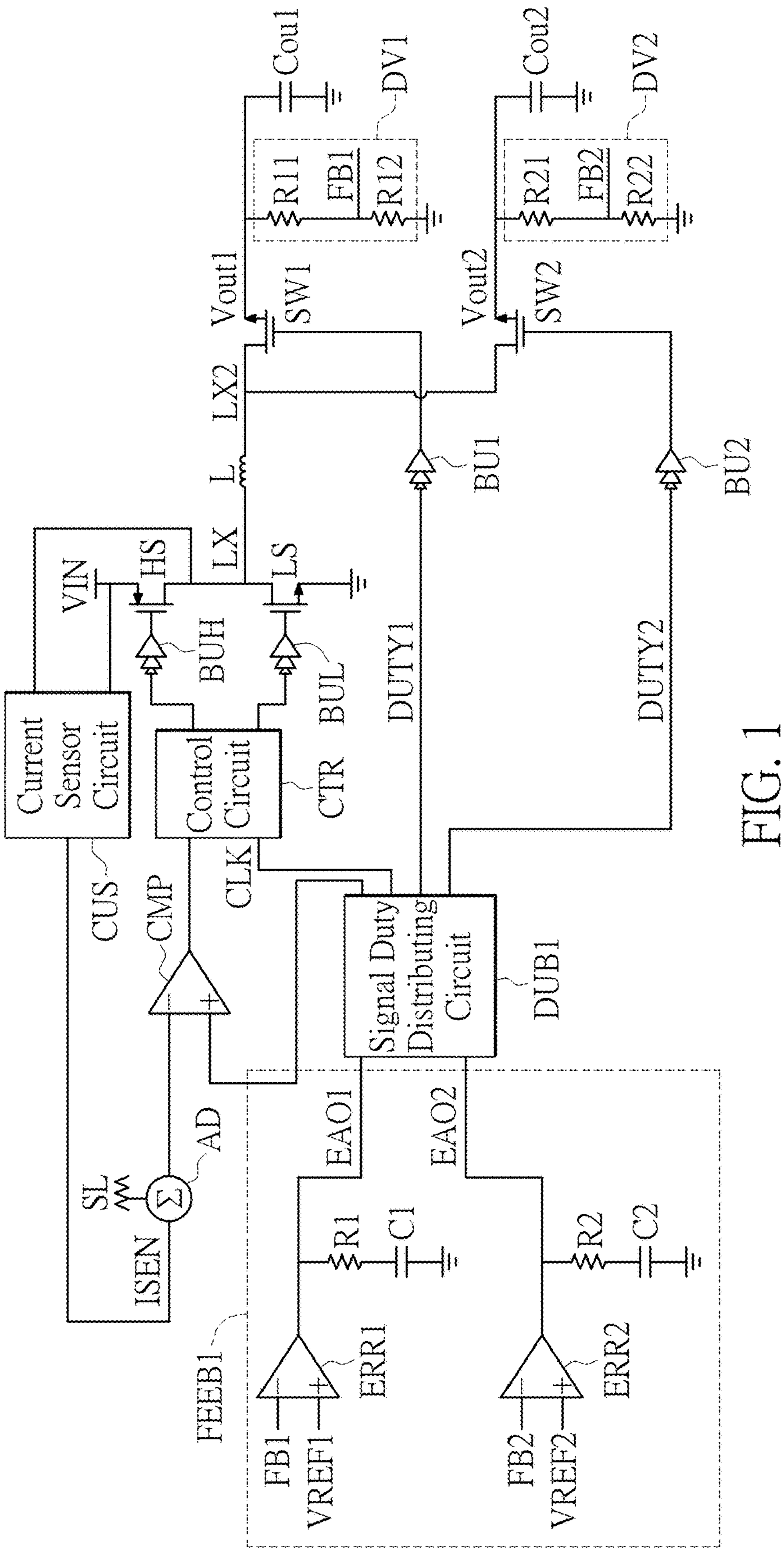
FIG. 1 is a circuit diagram of a multi-output power converter having a single inductor according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a circuit diagram of a multi-output power converter having a single inductor according to a first embodiment of the present disclosure.

The multi-output power converter of the present disclosure includes a high-side switch HS, a low-side switch LS, a control circuit CTR and a signal duty distributing circuit DUB1 as shown in FIG. 1. In particular, the multi-output power converter of the present disclosure further includes a plurality of output switches such as, but not limited to, a first output switch SW1 and a second output switch SW2 as shown in FIG. 1.

A first terminal of the high-side switch HS is coupled with an input voltage VIN. A first terminal of the low-side switch LS is connected to a second terminal of the high-side switch HS. A second terminal of the low-side switch LS is grounded. A node between the first terminal of the low-side switch LS and the second terminal of the high-side switch HS is connected to a first terminal of an inductor L.

The control circuit CTR is connected to a control terminal of the high-side switch HS and a control terminal of the low-side switch LS. The control circuit CTR controls the high-side switch HS and the low-side switch LS.

If necessary, the multi-output power converter of the present disclosure may further include a high-side buffer BUH, a low-side buffer BUL or a combination thereof.

An input terminal of the high-side buffer BUH and an input terminal of the low-side buffer BUL are connected to an output terminal of the control circuit CTR. An output terminal of the high-side buffer BUH is connected to the control terminal of the high-side switch HS. An output terminal of the low-side buffer BUL is connected to the control terminal of the low-side switch LS.

A first terminal of the first output switch SW1 and a first terminal of the second output switch SW2 are connected to a second terminal of the inductor L. A second terminal of the first output switch SW1 is connected to a first terminal of an output capacitor Cou1. A second terminal of the second output switch SW2 is connected to a first terminal of an output capacitor Cou2. A second terminal of the output capacitor Cou1 and a second terminal of the output capacitor Cou2 are grounded.

The second terminal of the first output switch SW1 or the first terminal of the output capacitor Cou1 is used as a first output terminal of the multi-output power converter of the present disclosure. The second terminal of the first output switch SW1 or the first terminal of the output capacitor Cou1 is connected to a first load among a plurality of loads, and supplies an output voltage Vout1 to the first load.

The second terminal of the second output switch SW2 or the first terminal of the output capacitor Cou2 is used as a second output terminal of the multi-output power converter of the present disclosure. The second terminal of the second output switch SW2 or the first terminal of the output capacitor Cou2 is connected to a second load among the plurality of loads, and supplies an output voltage Vout2 to the second load.

It should be understood that, the first output switch SW1 and the second output switch SW2 are exemplified in FIG. 1, but the present disclosure is not limited thereto. In practice, more output switches may be included in the multi-output power converter of the present disclosure according to actual requirements. A first terminal of each of the plurality of output switches is connected to the first terminal of the inductor L. A plurality of second terminals of the plurality of output switches are used as a plurality of output terminals of the multi-output power converter of the present disclosure, and are connected to the plurality of loads for supplying different amounts of power respectively to the plurality of loads.

The signal duty distributing circuit DUB1 may be connected to the second terminal and a control terminal of the first output switch SW1, and may be connected to the second terminal and a control terminal of the second output switch SW2.

It is worth noting that, the signal duty distributing circuit DUB1, according to a plurality of output voltages from the second terminal of the first output switch SW1 and the second terminal of the second output switch SW2, sets duty cycles of a plurality of waveforms of a plurality of switching signals DUTY1, DUTY2. Then, the signal duty distributing circuit DUB1 outputs the switching signals DUTY1, DUTY2 respectively to the control terminal of the first output switch SW1 and the control terminal of the second output switch SW2.

If necessary, the multi-output power converter of the present disclosure may include a feedback circuit. The feedback circuit is connected between the second terminals of the output switches and the signal duty distributing circuit DUB1. The feedback circuit may include a plurality of voltage dividers (such as, but not limited to, a first voltage divider circuit DV1 and a second voltage divider circuit DV2 as shown in FIG. 1), an error amplifying circuit FEEB1 or a combination thereof.

The error amplifying circuit FEEB1 may include a plurality of error amplifiers such as, but not limited to, a first error amplifier ERR1 and a second error amplifier ERR2 as shown in FIG. 1.

The first voltage divider circuit DV1 includes a first voltage dividing resistor R11 and a second voltage dividing resistor R12. A first terminal of the first voltage dividing resistor R11 is used as an input terminal of the first voltage divider circuit DV1, and is connected to a node (that is a first output terminal of the multi-output power converter of the present disclosure) between the second terminal of the first output switch SW1 and the first terminal of the output capacitor Cou1. A second terminal of the first voltage dividing resistor R11 is connected to a first terminal of the second voltage dividing resistor R12. A second terminal of the second voltage dividing resistor R12 is grounded. A feedback node FB1 between the second terminal of the first voltage dividing resistor R11 and the first terminal of the second voltage dividing resistor R12 is used as an output terminal of the first voltage divider circuit DV1.

A first input terminal such as inverting input terminal of the first error amplifier ERR1 is connected to the feedback node FB1. A second input terminal such as a non-inverting input terminal of the first error amplifier ERR1 is coupled with a reference voltage VREF1. An output terminal of the first error amplifier ERR1 is connected to an input terminal of the signal duty distributing circuit DUB1.

The second voltage divider circuit DV2 includes a first voltage dividing resistor R21 and a second voltage dividing resistor R22. A first terminal of the first voltage dividing resistor R21 is used as an input terminal of the second voltage divider circuit DV2. The first terminal of the first voltage dividing resistor R21 is connected to a node (that is a second output terminal of the multi-output power converter of the present disclosure) between the second terminal of the second output switch SW2 and the first terminal of the output capacitor Cou2. A second terminal of the first voltage dividing resistor R21 is connected to a first terminal of the second voltage dividing resistor R22. A second terminal of the second voltage dividing resistor R22 is grounded. A feedback node FB2 between the second terminal of the first voltage dividing resistor R21 and the first terminal of the second voltage dividing resistor R22 is used as an output terminal of the second voltage divider circuit DV2.

A first input terminal such as an inverting input terminal of the second error amplifier ERR2 is connected to the feedback node FB2. A second input terminal such as a non-inverting input terminal of the second error amplifier ERR2 is coupled with the reference voltage VREF2. An output terminal of the second error amplifier ERR2 is connected to an input terminal of the signal duty distributing circuit DUB1.

If necessary, the multi-output power converter of the present disclosure may further include a plurality of compensation resistors (such as, but not limited to, a first compensation resistor R1 and a second compensation resistor R2 as shown in FIG. 1), and a plurality of compensation capacitors (such as, but not limited to, a first compensation capacitor C1 and a second compensation capacitor C2 as shown in FIG. 1).

A first terminal of the first compensation resistor R1 is connected to the output terminal of the first error amplifier ERR1 and an output terminal of the signal duty distributing circuit DUB1. A second terminal of the first compensation resistor R1 is connected to a first terminal of the first compensation capacitor C1. A second terminal of the first compensation capacitor C1 is grounded.

A first terminal of the second compensation resistor R2 is connected to the output terminal of the second error amplifier ERR2 and the output terminal of the signal duty distributing circuit DUB1. A second terminal of the second compensation resistor R2 is connected to a first terminal of the second compensation capacitor C2. A second terminal of the second compensation capacitor C2 is grounded.

The first error amplifier ERR1 multiplies a difference between the reference voltage VREF1 and the output voltage Vout1 of the first output terminal of the multi-output power converter of the present disclosure or a divided voltage of the output voltage Vout1 (that is a voltage of the feedback node FB1) by a first gain to output an error amplified signal EAO1.

The second error amplifier ERR2 multiplies a difference between the reference voltage VREF2 and the output voltage Vout2 of the second output terminal of the multi-output power converter of the present disclosure or a divided voltage of the output voltage Vout2 (that is a voltage of the feedback node FB2) by a second gain to output an error amplified signal EAO2.

It is worth noting that, the signal duty distributing circuit DUB1, according to the error amplified signals EAO1, EAO2, sets the duty cycles of the plurality of waveforms of the switching signals DUTY1, DUTY2 that are outputted respectively to the control terminal of the first output switch SW1 and the control terminal of the second output switch SW2.

For example, the signal duty distributing circuit DUB1 may calculate a first voltage ratio of a voltage of the error amplified signal EAO1 to a sum of the voltage of the error amplified signal EAO1 and a voltage of the error amplified signal EAO2, and set the duty cycles of the plurality of waveforms of the switching signal DUTY1 according to the first voltage ratio.

A sum of the duty cycle of each of the plurality of waveforms of the switching signal DUTY1 and the duty cycle of each of the plurality of waveforms of the switching signal DUTY2 may be 100%. The signal duty distributing circuit DUB1 may subtract the duty cycle of each of the plurality of waveforms of the switching signal DUTY1 from 100% to obtain a duty ratio as the duty cycle of one of the plurality of waveforms of the switching signal DUTY2. Alternatively, the signal duty distributing circuit DUB1 may calculate a second voltage ratio of the voltage of the error amplified signal EAO2 to the sum of the voltage of the error amplified signal EAO1 and the voltage of the error amplified signal EAO2, and set the duty cycles of the plurality of waveforms of the switching signal DUTY2 according to the second voltage ratio.

It is worth noting that, the duty cycles of the plurality of waveforms of the switching signals DUTY1 are different from the duty cycles of the plurality of waveforms of the plurality of switching signals EAO2. Time during which the switching signal DUTY1 is at a high level is not overlapped with time during which the switching signal DUTY2 is at a high level. The first output switch SW1 and the second output switch SW2 are turned on respectively during a plurality of time intervals. An on-time of the high-side switch HS and an on-time of the low-side switch LS may be controlled to be different from each other such that currents that flow through the inductor L respectively within the plurality of time intervals are different from each other. As a result, the first output switch SW1 and the second output switch SW2 are turned on alternately for supplying different amounts of power respectively to the plurality of loads through the first output switch SW1 and the second output switch SW2 respectively within the plurality of time intervals. That is, the multi-output power converter of the present disclosure is capable of supplying different amounts of power respectively to the plurality of loads.

If necessary, the multi-output power converter of the present disclosure may further include a plurality of buffers (such as, but not limited to a first buffer BU1 and second buffer BU2 as shown in FIG. 1), a current sensor circuit CUS, a sensing processor AD and a comparator CMP, one or more of which may be omitted.

An input terminal of the first buffer BU1 is connected to the output terminal of the signal duty distributing circuit DUB1. An output terminal of the first buffer BU1 is connected to the control terminal of the first output switch SW1.

An input terminal of the first buffer BU2 is connected to the output terminal of the signal duty distributing circuit DUB1. An output terminal of the second buffer BU2 is connected to the control terminal of the second output switch SW2.

The current sensor circuit CUS is connected to the first terminal of the high-side switch HS. The current sensor circuit CUS may sense a current flowing through the high-side switch HS, convert the current into a voltage, and output a sensed signal ISEN according to converted voltage.

The sensing processor AD is connected to the current sensor circuit CUS. The sensing processor AD may output a sensing processing signal according to a voltage of the sensed signal ISEN and a voltage of a slope signal SL from an external slope generator (that is not shown in figures). For example, the sensing processor AD may include an adder or other circuit component that has a function of adding up the voltage of the sensed signal ISEN and the voltage of the slope signal SL to output the sensing processing signal.

A first input terminal such as an inverting input terminal of the comparator CMP is connected to the sensing processor AD, and receives the sensing processing signal from the sensing processor AD. A second input terminal such as a non-inverting input terminal of the comparator CMP is connected to the signal duty distributing circuit DUB1, and receives a total error amplified signal from the signal duty distributing circuit DUB1. A voltage of the total error amplified signal is a total error amplified voltage that is the sum of the voltage of the error amplified signal EAO1 and the voltage of the error amplified signal EAO2. An output terminal of the comparator CMP is connected to an input terminal of the control circuit CTR. The control circuit CTR may, according to the total error amplified signal from the signal duty distributing circuit DUB1 and a comparing signal from the comparator CMP, control the high-side switch HS and the low-side switch LS so as to control the current that flows to the load through the inductor L. For example, in a peak current mode, the control circuit CTR controls a peak value of the current that flows to the load through the inductor L, but the present disclosure is not limited thereto.

Figure 2:
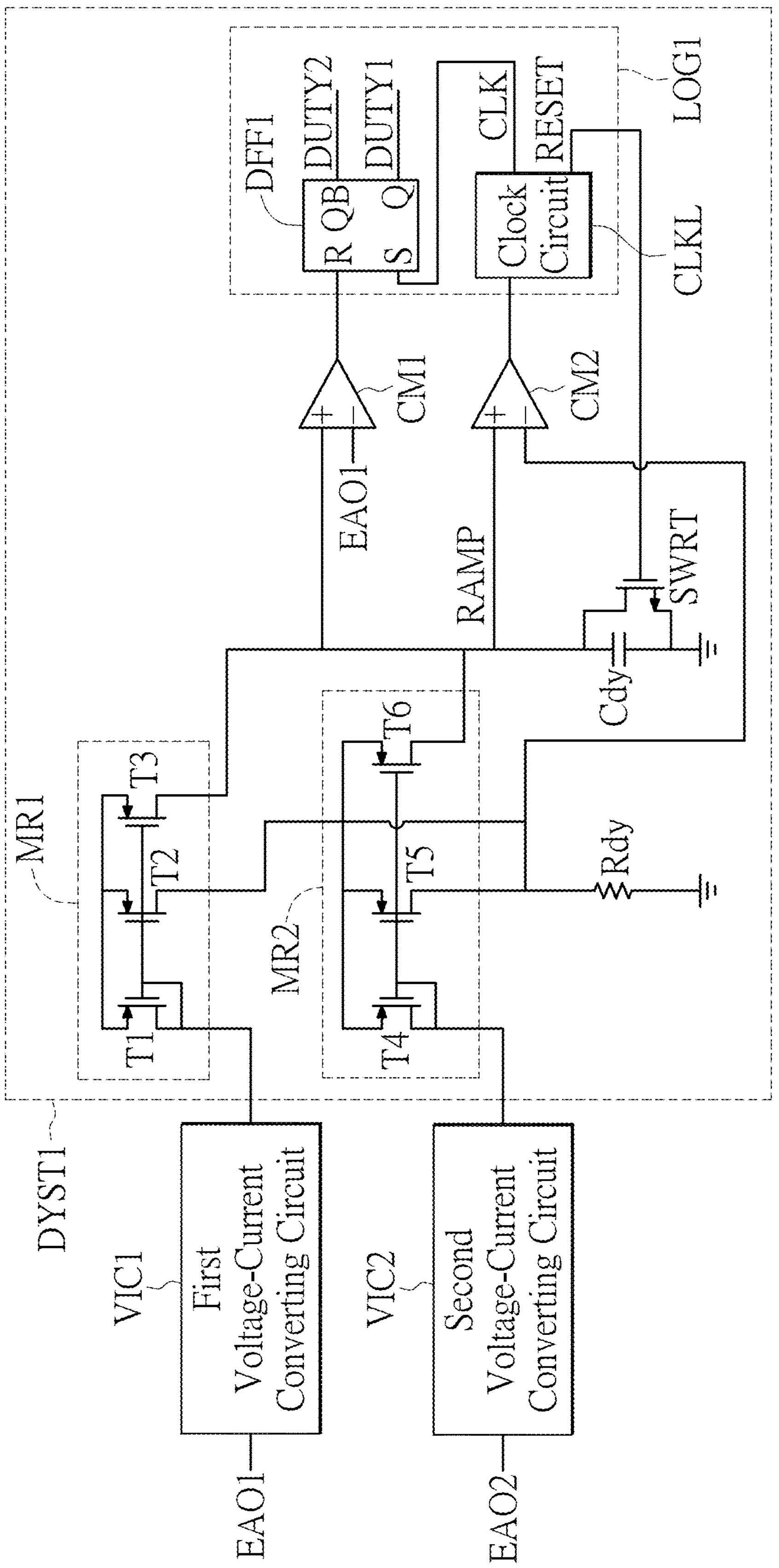
FIG. 2 is a circuit diagram of a signal duty distributing circuit of a multi-output power converter having a single inductor according to a second embodiment of the present disclosure.
Figure 3:
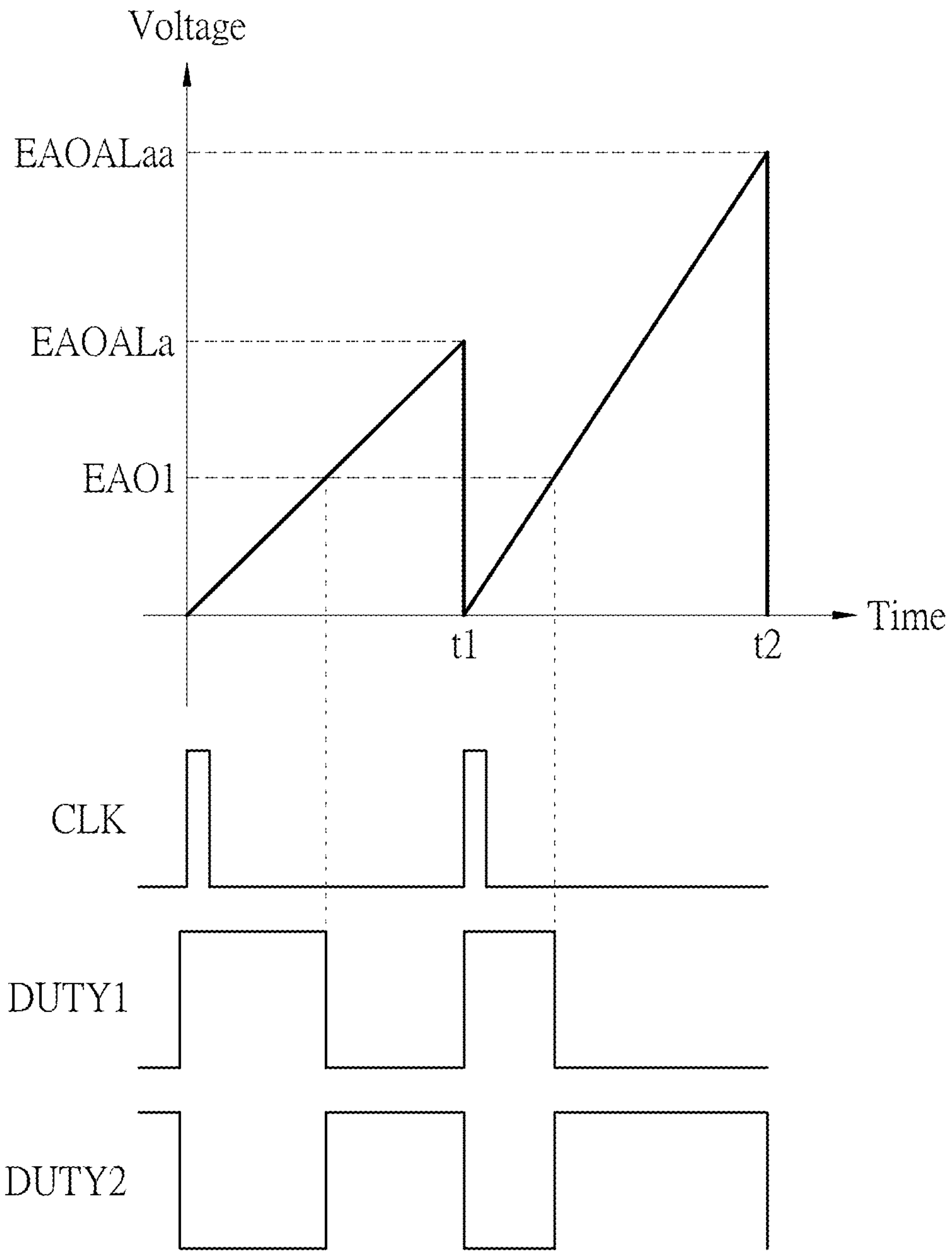
FIG. 3 is a waveform diagram of signals of the multi-output power converter having the single inductor according to the second embodiment of the present disclosure.

Reference is made to FIG. 2 and FIG. 3, in which FIG. 2 is a circuit diagram of a signal duty distributing circuit of a multi-output power converter having a single inductor according to a second embodiment of the present disclosure, and FIG. 3 is a waveform diagram of signals of the multi-output power converter having the single inductor according to the second embodiment of the present disclosure.

The signal duty distributing circuit DUB1 of the multi-output power converter of the present disclosure as shown in FIG. 1 may include a plurality of voltage-current converting circuits (such as, but not limited to a first voltage-current converting circuit VIC1 and a second voltage-current converting circuit VIC2 as shown in FIG. 2), and a duty cycle setting circuit DYST1 as shown in FIG. 2.

As shown in FIG. 2, the duty cycle setting circuit DYST1 may include a charging resistor Rdy, a charging capacitor Cdy, a first comparator CM1, a second comparator CM2 and a switching signal generator circuit LOG1. The switching signal generator circuit LOG1 may include a first flip-flop DFF1 and a clock circuit CLKL. If necessary, the duty cycle setting circuit DYST1 may further include a plurality of current mirror circuits (such as, but not limited to a first current mirror circuit MR1 and a second current mirror circuit MR2 as shown FIG. 2) and a reset switch SWRT shown FIG. 2.

An input terminal of the first voltage-current converting circuit VIC1 shown in FIG. 2 is connected to an output terminal of the first error amplifier ERR1 shown in FIG. 1, and receives the error amplified signal EAO1 from the output terminal of the first error amplifier ERR1. An input terminal of the first voltage-current converting circuit VIC2 shown in FIG. 2 is connected to an output terminal of the first error amplifier ERR2 shown in FIG. 1, and receives the error amplified signal EAO2 from the output terminal of the second error amplifier ERR2.

The first current mirror circuit MR1 includes a first transistor T1, a second transistor T2 and a third transistor T3. A first terminal of the first transistor T1 is connected to a first terminal of the second transistor T2 and a first terminal of the third transistor T3. A second terminal and a control terminal of the first transistor T1 are connected to an output terminal of the first voltage-current converting circuit VIC1, a control terminal of the second transistor T2 and a control terminal of the third transistor T3.

A second terminal of the second transistor T2 is connected to a first terminal of the charging resistor Rdy. A second terminal of the charging resistor Rdy is grounded. A second terminal of the third transistor T3 is connected to a first terminal of the charging capacitor Cdy. A second terminal of the charging capacitor Cdy is grounded.

The first voltage-current converting circuit VIC1 converts the voltage of the error amplified signal EAO1 into an error amplified current and outputs the error amplified current to the second terminal of the first transistor T1. The error amplified current of the error amplified signal EAO1 is calculated by using an equation of: $I1=VEAO1/R$, wherein I1 represents the error amplified current converted from the error amplified signal EAO1, VEAO1 represents the voltage of the error amplified signal EAO1, and R represents a resistance of the charging resistor Rdy.

The second current mirror circuit MR2 includes a fourth transistor T4, a fifth transistor T5 and a sixth transistor T6. A first terminal of the fourth transistor T4 is connected to a first terminal of the fifth transistor T5 and a first terminal of the sixth transistor T6. A second terminal and a control terminal of the fourth transistor T4 are connected to an output terminal of the second voltage-current converting circuit VIC2, a control terminal of the fifth transistor T5 and a control terminal of the sixth transistor T6. A second terminal of the fifth transistor T5 is connected to a first terminal of the charging resistor Rdy. A second terminal of the sixth transistor T6 is connected to the first terminal of the charging capacitor Cdy.

The second voltage-current converting circuit VIC2 converts the error amplified signal EAO2 into the error amplified current, and outputs the error amplified current to the second terminal of the fourth transistor T4. The error amplified current of the error amplified signal EAO2 is calculated by using an equation of: $I2=VEAO2/R$, wherein I2 represents the error amplified current converted from the error amplified signal EAO2, VEAO2 represents the voltage of the error amplified signal EAO2, and R represents the resistance of the charging resistor Rdy.

A first input terminal such as a non-inverting input terminal of the first comparator CM1 is connected to the first terminal of the charging capacitor Cdy. A second input terminal such as an inverting input terminal of the first comparator CM1 is connected to the output terminal of the first error amplifier ERR1, and receives the error amplified signal EAO1 from the output terminal of the first error amplifier ERR1.

A first input terminal such as a non-inverting input terminal of the second comparator CM2 is connected to the first terminal of the charging capacitor Cdy, and receives a capacitor voltage RAMP of the first terminal of the charging capacitor Cdy. A second input terminal such as an inverting input terminal of the second comparator CM2 is connected to the first terminal of the charging resistor Rdy, and receives a voltage of the first terminal of the charging resistor Rdy. The voltage of the first terminal of the charging resistor Rdy is calculated by using an equation of: VEAOALL=VEAO11+VEAO12, wherein VEAOALL represents the total error amplified voltage that is the sum of the voltage of the error amplified signal EAO1 and the voltage of the error amplified signal EAO2, the voltage of the first terminal of the charging resistor Rdy is equal to a voltage of the total error amplified voltage VEAOALL, VEAO1 represents the voltage of the error amplified signal EAO1, and VEAO2 represents the voltage of the error amplified signal EAO2.

A charging current flowing to the charging capacitor Cdy is a sum of an error amplified current I1 converted from the error amplified signal EAO1 and an error amplified current I2 converted from the error amplified signal EAO2. The second input terminal such as the inverting input terminal of the second comparator CM2 receives a voltage of the charging capacitor Cdy. The voltage of the charging resistor Rdy is calculated by using an equation of:

$$Vdy=(I1+I2)\times Rdy,$$

wherein Vdy represents the voltage of the charging resistor Rdy, I1 represents the error amplified current converted from the error amplified signal EAO1, I2 represents the error amplified current converted from the error amplified signal EAO2, and Rdy represents the resistance of the charging resistor Rdy.

A charging time during which the charging capacitor Cdy is charged is calculated by using an equation of:

$$T=Cdy\times(I1+I2)\times Rdy/(I1+I2)=Cdy\times Rdy,$$

wherein T represents the charging time during which the charging capacitor Cdy is charged, Cdy represents a capacitance of the charging capacitor Cdy, I1 represents the error amplified current converted from the error amplified signal EAO1, I2 represents the error amplified current converted from the error amplified signal EAO2, and Rdy represents the resistance of the charging resistor Rdy.

When the multi-output power converter of the present disclosure operates in the peak current mode, the clock signal CLK having a constant frequency is generated within the charging time T of the charging capacitor Cdy.

A first input terminal R of the first flip-flop DFF1 is connected to an output terminal of the first comparator CM1. An output terminal Q of the first flip-flop DFF1 shown in FIG. 2 is connected to the control terminal of the first output switch SW1, and outputs the switching signal DUTY1 to the control terminal of the first output switch SW1 shown in FIG. 1. An inverting output terminal QB of the first flip-flop DFF1 shown in FIG. 2 is connected to the control terminal of the second output switch SW2 shown in FIG. 1, and outputs the switching signal DUTY2 to the control terminal of the second output switch SW2.

An input terminal of the clock circuit CLKL is connected to an output terminal of the second comparator CM2. A first output terminal of the clock circuit CLKL is connected to a second input terminal S of the first flip-flop DFF1, and outputs the clock signal CLK to the second input terminal S of the first flip-flop DFF1. The first output terminal of the clock circuit CLKL shown in FIG. 2 may be further connected to the control circuit CTR shown in FIG. 1, and outputs the clock signal CLK to the control circuit CTR. The control circuit CTR may control the high-side switch HS and the low-side switch LS according to the clock signal CLK.

A control terminal of the reset switch SWRT is connected to a second output terminal of the clock circuit CLKL, and receives the reset signal RESET from the second output terminal of the clock circuit CLKL. A first terminal of the reset switch SWRT is connected to the first terminal of the charging capacitor Cdy. A second terminal of the reset switch SWRT is grounded. When the second output terminal of the clock circuit CLKL outputs the reset signal RESET (at a high level) for turning on the reset switch SWRT, the voltage of the first terminal of the charging capacitor Cdy is discharged to a ground through the reset switch SWRT being turned on, and a voltage of the first input terminal such as the non-inverting input terminal of the second comparator CM2 is pulled down to a zero value. An upper waveform in FIG. 3 is a waveform of the voltage of the charging capacitor Cdy.

For example, as shown in FIG. 3, at a time point t2, the voltage VEAO2 of the error amplified signal EAO2 is twice the voltage VEAO1 of the error amplified signal EAO1. A total error amplified voltage EAOALaa of the first terminal of the charging resistor Rdy at the time point t2 is 1.5 times a total error amplification voltage EAOALa of the charging resistor Rdy at a time point t1. For example, the clock signal CLK, the switching signal DUTY1 and the switching signal DUTY2 as shown in FIG. 2 may have waveforms shown in FIG. 3, but the present disclosure is not limited thereto. The voltage VEAO2 of the error amplified signal EAO2 at the time point t1 may be equal to the total error amplification voltage EAOALa from which the voltage VEAO1 of the error amplified signal EAO1 is subtracted. The voltage VEAO2 of the error amplified signal EAO2 at the time point t2 may be equal to the total error amplification voltage EAOALaa from which the voltage VEAO1 of the error amplified signal EAO1 as shown in FIG. 3 is subtracted.

It is worth noting that, as shown in FIG. 3, the sum of the duty cycle of each of the plurality of waveforms of the switching signal DUTY1 and the duty cycle of each of the plurality of waveforms of the switching signal DUTY2 is 100%. A time interval during which the switching signal DUTY1 is at a high level is not overlapped with a time interval during which the switching signal DUTY2 is at a high level. Within the time interval during which the switching signal DUTY1 is at the high level, a first output current flows to the first load sequentially through the inductor L and the first output switch SW1 being turned on. Within the time interval during which the switching signal DUTY2 is at the high level, a second output current flows to the second load sequentially through the inductor L and the first output switch SW2 being turned on. Therefore, even if only the single inductor L is disposed, the multi-output power converter of the present disclosure is capable of supplying different amounts of power respectively to the plurality of loads.

When the multi-output power converter of the present disclosure operates in the peak current mode, the total error amplified voltage VEAOALL that is the sum of the voltage of the error amplified signal EAO1 and the voltage of the error amplified signal EAO2 is proportional to a current flowing through the inductor L. Therefore, within each of a plurality of time periods of the waveforms of the clock signal CLK, an energy level of the output voltage Vout1 of the multi-output power converter of the present disclosure is proportional to the total error amplified voltage VEAOALL multiplied by the duty cycle of the switching signal DUTY1, and an energy level of the output voltage Vout2 of the multi-output power converter of the present disclosure is proportional to the total error amplified voltage VEAOALL multiplied by the duty cycle of the switching signal DUTY2.

Within a time interval having the time point t1 as an upper limit time point as shown in FIG. 3.

$$VEAO1 = VEAO2,$$

$$VEAOALL = 2 \times VEAO1 = 2 \times VEAO2, \text{ and}$$

$$DTY1 = DTY2 = 50\%,$$

wherein VEAO1 represents the voltage of the error amplified signal EAO1, VEAO2 represents the voltage of the error amplified signal EAO2, VEAOALL represents the total error amplified voltage that is the sum of the voltage of the error amplified signal EAO1 and the voltage of the error amplified signal EAO2, DTY1 represents the duty cycle of the switching signal DUTY1, and DTY2 represents the duty cycle of the switching signal DUTY2. At this time, a relationship between the voltage VEAO1 of the error amplified signal EAO1 and the total error amplified voltage VEAOALL is represented by using an equation of:

$$VEAOALL \times 50\% = 2 \times VEAO1 \times 50\% = VEAO1.$$

Under this condition, the output voltage Vout1 and the output voltage Vout2 of the multi-output power converter of the present disclosure are equal to each other.

Within a time interval having the time point t2 as an upper limit time point as shown in FIG. 3, VEAO2=2×VEAO1=>VEAOALL=3×VEAO1 and DUTY1=33.3%. Therefore, the output voltage Vout1 at the time point t1 is equal to the output voltage Vout1 at the time point t2. At this time, the relationship between the voltage VEAO1 of the error amplified signal EAO1 and the total error amplified voltage VEAOALL is represented by using an equation of:

$$VEAOALL \times DTY1 = 3 \times VEAO1 \times 33.3\% = VEAO1.$$

When the voltage VEAO1 of the error amplified signal EAO1 is maintained at the same value from the time point t1 to the time point t2, the output voltage Vout1 of the multi-output power converter of the present disclosure is not changed. However, the output voltage Vout2 of the multi-output power converter of the present disclosure is increased at the time point t2. At the time point t2, the relationship between the voltage VEAO1 of the error amplified signal EAO1 and the total error amplified voltage VEAOALL is represented by an equation of:

$$VEAOALL(t2) \times Duty2(t2) = 3 \times VEAO1 \times 66.7\% = 2 \times VEAO1.$$

The output voltage Vout2 of the multi-output power converter of the present disclosure at the time point t2 is twice the output voltage Vout2 at the time point t1. The voltage VEAO2 of the error amplified signal EAO1 at the time point t2 is twice the VEAO2 of the error amplified signal EAO1 at the time point t1. That is, energy required for the output voltage Vout2 the time point t2 is twice energy required for the output voltage Vout2 at the time point t1.

When one of the plurality of loads connected to the plurality of output terminals of the multi-output power converter (that are used for outputting the output voltages Vout1, Vout2) of the present disclosure changes, the multi-output power converter is capable of supplying appropriate power to the one of the plurality of loads without affecting supply of the output voltages Vout1, Vout2.

As shown in FIG. 2, the multi-output power converter of the present disclosure includes a first comparator CM1 for distributing energy and reducing interference between the loads changing.

Figure 4:
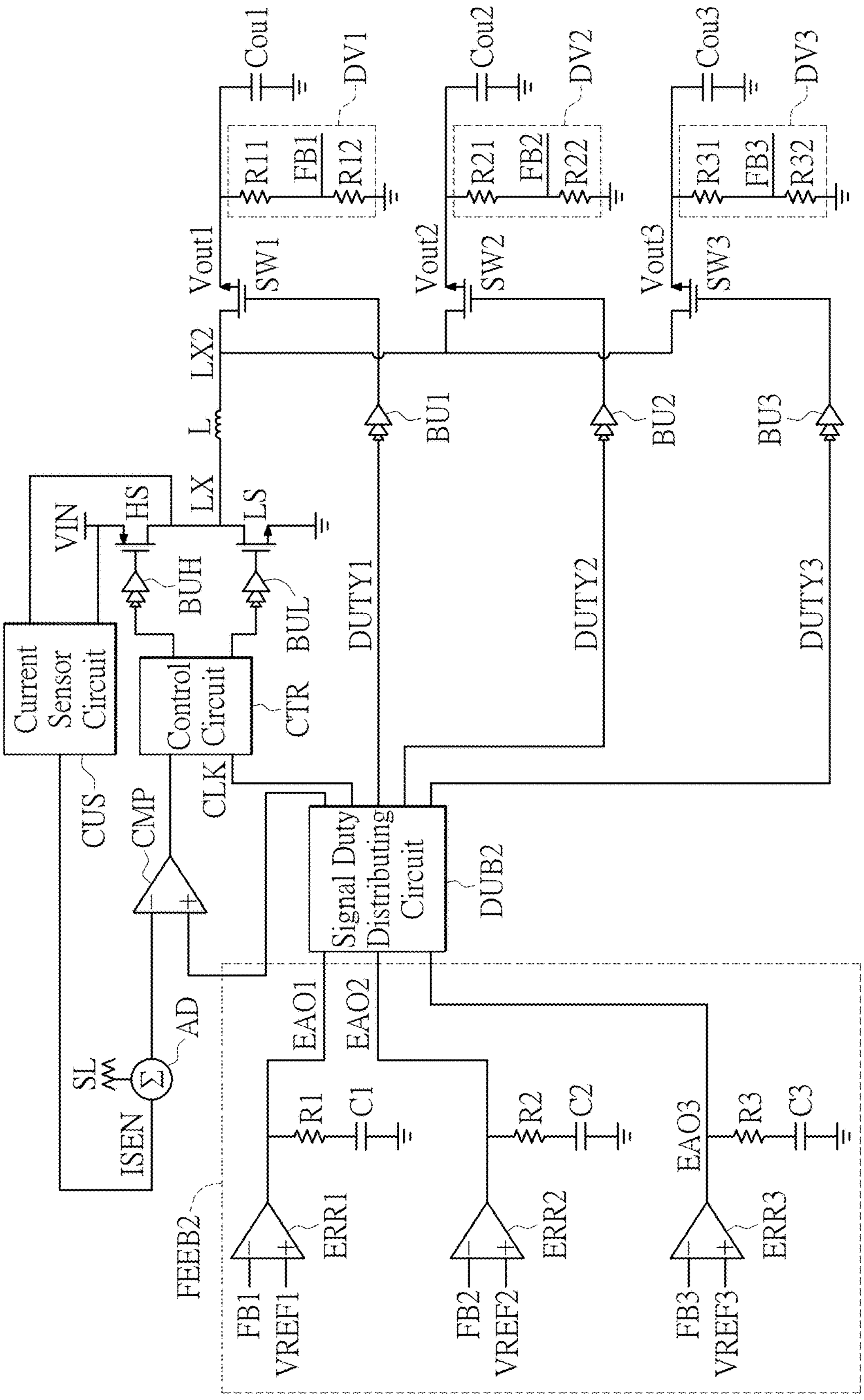
FIG. 4 is a circuit diagram of a multi-output power converter having a single inductor according to a third embodiment of the present disclosure.
Figure 7:
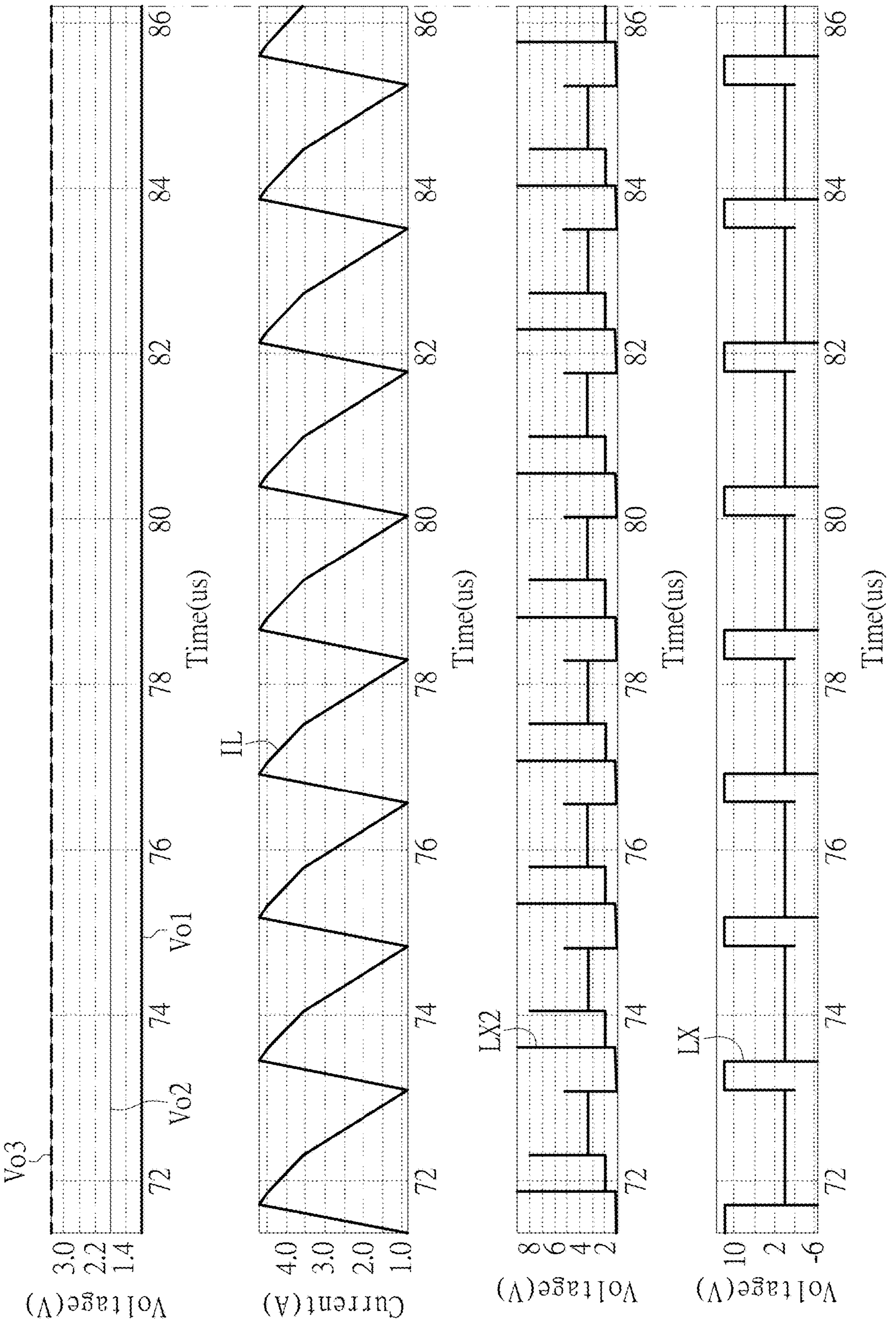
FIG. 7 is a waveform diagram of signals of the multi-output power converter having the single inductor according to the third and fourth embodiments of the present disclosure.
Figure 8:
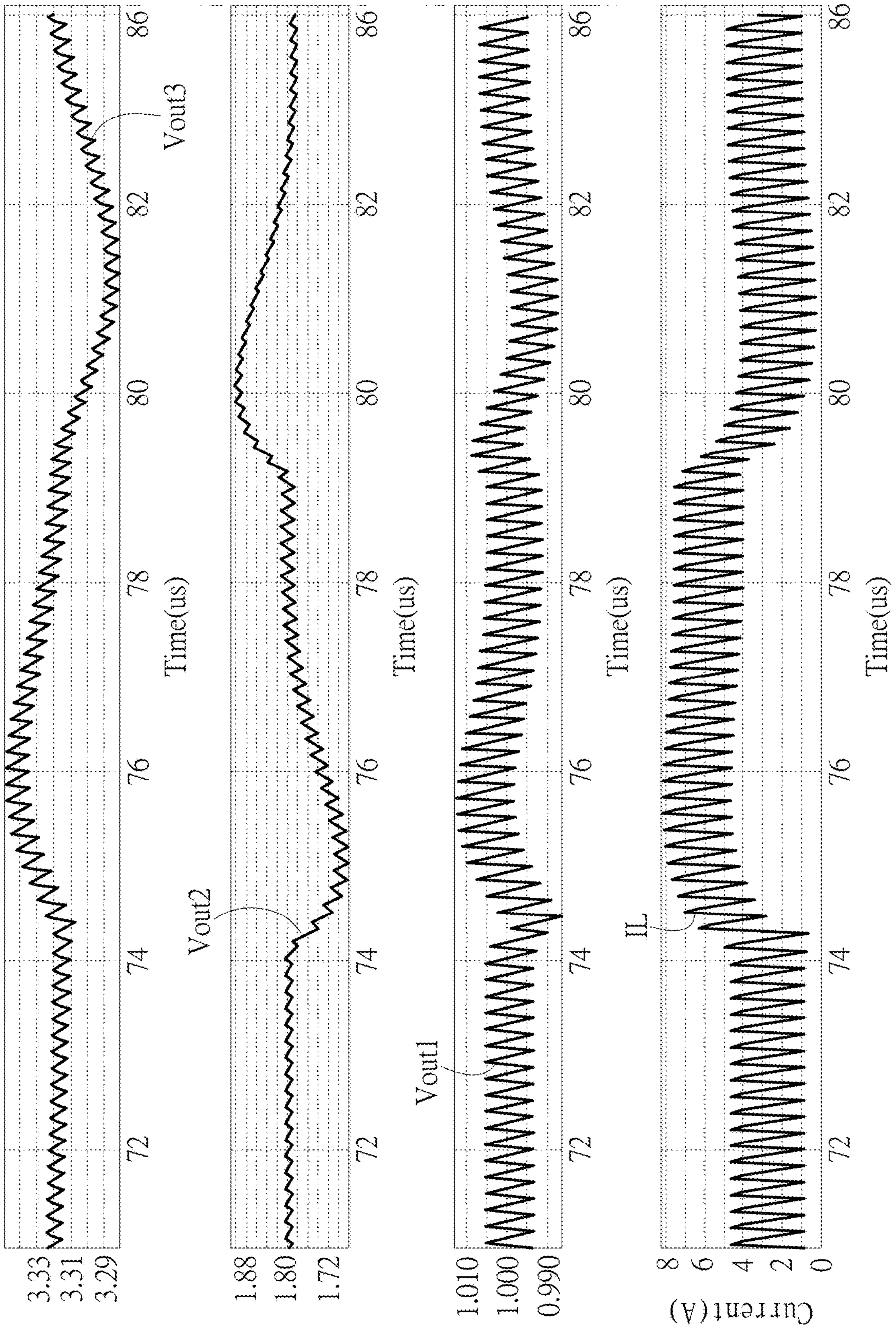
FIG. 8 is a waveform diagram of signals of the multi-output power converter having the single inductor according to the third and fourth embodiments of the present disclosure.

Reference is made to FIG. 4, FIG. 7 and FIG. 8, in which FIG. 4 is a circuit diagram of a multi-output power converter having a single inductor according to a third embodiment of the present disclosure, and FIG. 7 and FIG. 8 are waveform diagrams of signals of the multi-output power converter having the single inductor according to the third and fourth embodiments of the present disclosure. The descriptions of the third embodiment of the present disclosure that are the same as the descriptions of the first embodiment of the present disclosure are not repeated herein.

A difference between the multi-output power converter shown in FIG. 1 and the multi-output power converter shown in FIG. 4 is that, the multi-output power converter shown in FIG. 1 has two output terminals respectively for supplying the output voltages Vout1, Vout2, the multi-output power converter of the present disclosure shown in FIG. 4 has three terminals respectively for supplying the output voltages Vout1, Vout2, Vout3. For example, the output voltages Vout1, Vout2, Vout3 as shown in FIG. 4 may be equal to output voltages Vo1, Vo2, Vo3 as shown in FIG. 7. In practice, the multi-output power converter of the present disclosure may, according to actual requirements, include more output terminals and more circuit components that are configured in the same or similar manner of FIG. 4 for supplying more output voltages to more loads.

The multi-output power converter of the present disclosure shown in FIG. 4 further includes a third output switch SW3, an output capacitor Cou3, a third voltage divider circuit DV3, a third error amplifier ERR3, a third compensation resistor R3, a third compensation capacitor C3 and a third buffer BU3 for achieving an effect of supplying the output voltages Vout1, Vout2, Vout3.

A first terminal of the third output switch SW3 is connected to the second terminal of the inductor L. For example, an inductor voltage signal at the second terminal of the inductor L shown in FIG. 4 may be the same as an inductor voltage signal LX2 shown in FIG. 7. For example, a voltage signal between the first terminal of the low-side switch LS and the second terminal of the high-side switch HS may be the same as a node voltage signal LX shown in FIG. 7.

A second terminal of the third output switch SW3 is connected to a first terminal of the output capacitor Cou3. A second terminal of the output capacitor Cou3 is grounded. The second terminal of the third output switch SW3 or the first terminal of the output capacitor Cou3 is used as a third output terminal of the multi-output power converter of the present disclosure. The second terminal of the third output switch SW3 or the first terminal of the output capacitor Cou3 is connected to a third load among the plurality of loads for supplying the output voltage Vout3 to the third load.

The third voltage divider circuit DV3 includes a first voltage dividing resistor R31 and a second voltage dividing resistor R32. A first terminal of the first voltage dividing resistor R31 is used as an input terminal of the third voltage divider circuit DV3, and is connected to a node between the second terminal of the third output switch SW3 and the first terminal of the output capacitor Cou3. A second terminal of the first voltage dividing resistor R31 is connected to a first terminal of the second voltage dividing resistor R32. A second terminal of the second voltage dividing resistor R32 is grounded. A feedback node FB3 between the second terminal of the first voltage dividing resistor R31 and the first terminal of the second voltage dividing resistor R32 is used as an output terminal of the third voltage divider circuit DV3.

A first input terminal such as an inverting input terminal of the third error amplifier ERR3 is connected to the feedback node FB3. A second input terminal such as a non-inverting input terminal of the third error amplifier ERR3 is coupled with a reference voltage VREF3. An output terminal of the third error amplifier ERR3 is connected to the signal duty distributing circuit DUB1, and outputs an error amplified signal EAO to the signal duty distributing circuit DUB1.

A first terminal of the third compensation resistor R3 is connected to the output terminal of the third error amplifier ERR3 and the input terminal of the signal duty distributing circuit DUB1. A second terminal of the third compensation resistor R3 is connected to a first terminal of the third compensation capacitor C3. A second terminal of the third compensation capacitor C3 is grounded.

It is worth noting that, the signal duty distributing circuit DUB1, according to the error amplified signals EAO1, EAO2, EAO3 respectively from the output terminals of the first error amplifier ERR1, the second error amplifier ERR2 and the third error amplifier ERR3, sets the duty cycles of the switching signals DUTY1, DUTY2, DUTY3 that are outputted respectively to the control terminals of the first output switch SW1, the second output switch SW2 and the third output switch SW3.

Figure 5:
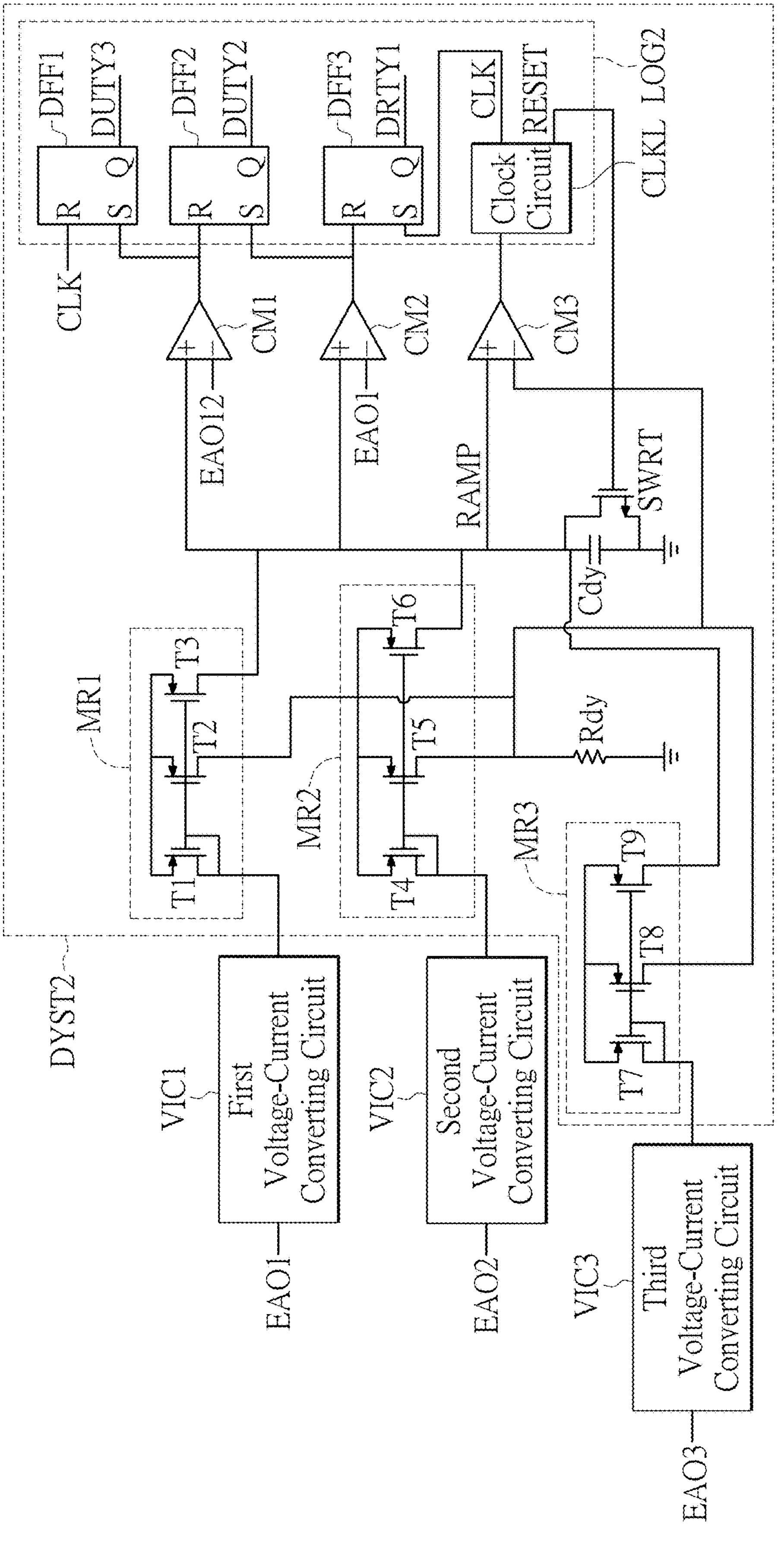
FIG. 5 is a circuit diagram of a signal duty distributing circuit of a multi-output power converter having a single inductor according to a fourth embodiment of the present disclosure.
Figure 6:
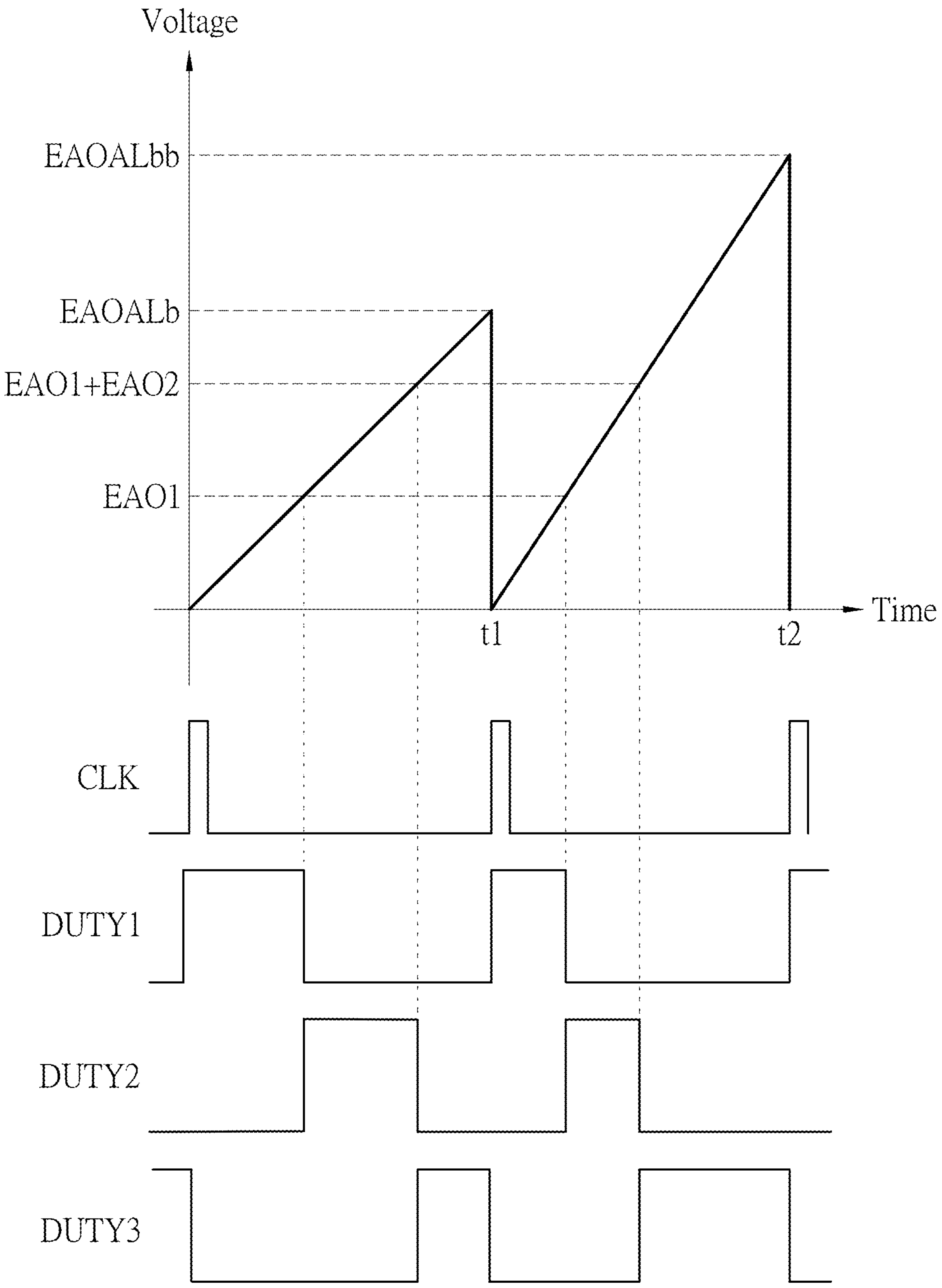
FIG. 6 is a waveform diagram of signals of the multi-output power converter having the single inductor according to the fourth embodiment of the present disclosure.

Reference is made to FIG. 5 to FIG. 8, in which FIG. 5 is a circuit diagram of a signal duty distributing circuit of a multi-output power converter having a single inductor according to a fourth embodiment of the present disclosure, FIG. 6 is a waveform diagram of signals of the multi-output power converter having the single inductor according to the fourth embodiment of the present disclosure, and FIG. 7 and FIG. 8 are waveform diagrams of signals of the multi-output power converter having the single inductor according to the third and fourth embodiments of the present disclosure.

The same descriptions of the fourth embodiment of the present disclosure are the same as the same descriptions of the second embodiment of the present disclosure are not repeated herein.

A difference between the multi-output power converter of the present disclosure as shown in FIG. 2 and the multi-output power converter of the present disclosure as shown in FIG. 5 is that, the multi-output power converter of the present disclosure as shown in FIG. 5 further includes a third voltage-current converting circuit VIC3. As shown in FIG. 5, the duty cycle setting circuit DYST2 further includes a third current mirror circuit MR3, a third comparator CM3 and a switching signal generator circuit LOG2. As shown in FIG. 5, the switching signal generator circuit LOG2 includes a first flip-flop DFF1, a second flip-flop DFF2, a third flip-flop DFF3 and the clock circuit CLKL. For example, the first flip-flop DFF1, the second flip-flop DFF2 and the third flip-flop DFF3 may be SR flip-flops, but the present disclosure is not limited thereto.

The third current mirror circuit MR3 includes a seventh transistor T7, an eighth transistor T8 and a ninth transistor T9. A first terminal of the seventh transistor T7 is connected to a first terminal of the eighth transistor T8 and a first terminal of the ninth transistor T9. A second terminal and a control terminal of the seventh transistor T7 are connected to an output terminal of the third voltage-current converting circuit VIC3, a control terminal of the eighth transistor T8 and a control terminal of the ninth transistor T9. A second terminal of the eighth transistor T8 is connected to the first terminal of the charging resistor Rdy. A second terminal of the ninth transistor T9 is connected to the first terminal of the charging capacitor Cdy.

The first input terminal such as the non-inverting input terminal of each of the comparators CMP1 to CMP3 is connected to the first terminal of the charging capacitor Cdy. A second terminal such as an inverting input terminal of the first comparator CM1 is coupled with a total voltage EAO12. The total voltage EAO12 is a sum of the voltage of the error amplified signal EAO1 outputted by the first error amplifier ERR1 and the voltage of the error amplified signal EAO2 outputted by the second error amplifier ERR2. A second input terminal such as an inverting input terminal of the second comparator CM2 is connected to the output terminal of the first error amplifier ERR1, and receives the error amplified signal EAO1 from the output terminal of the first error amplifier ERR1. A second input terminal such as an inverting input terminal of the third comparator CM3 is connected to the first terminal of the charging resistor Rdy.

The voltage of the first terminal of the charging resistor Rdy is a total error amplified voltage that is a sum of the voltage the error amplified signal EAO1 from the output terminal of the first error amplifier ERR1, the voltage the error amplified signal EAO2 from the second error amplifier ERR2 and the voltage the error amplified signal EAO3 from the third error amplifier ERR3. For example, the total error amplified voltage may be the same as a total error amplified voltage EAOALb at the time point t1 as shown in FIG. 6, and may be the same as a total error amplified voltage EAOALbb at the time point t2 as shown in FIG. 6.

The second input terminal S of the first flip-flop DFF1 and the first input terminal R of the second flip-flop DFF2 are connected to the output terminal of the first comparator CM1. The second input terminal S of the second flip-flop DFF2 and the first input terminal R of the third flip-flop DFF3 are connected to the output terminal of the second comparator CM2. The input terminal of the clock circuit CLKL is connected to an output terminal of the third comparator CM3. The first input terminal R of the first flip-flop DFF1 as shown in FIG. 5, the second input terminal S of the third flip-flop DFF3 as shown in FIG. 5 and the control circuit CTR as shown in FIG. 4 are connected to the first output terminal of the clock circuit CLKL as shown in FIG. 5, and receive the clock signal CLK from the clock circuit CLKL.

The output terminal Q of the third flip-flop DFF3 shown in FIG. 5 is connected to the control terminal of the first output switch SW1 shown in FIG. 4. The output terminal Q of the second flip-flop DFF2 shown in FIG. 5 is connected to the control terminal of the second output switch SW2 shown in FIG. 4. The output terminal Q of the first flip-flop DFF1 shown in FIG. 5 is connected to the control terminal of the third output switch SW3 shown in FIG. 4.

The second output terminal of the clock circuit CLKL is connected to the control terminal of the reset switch SWRT, and outputs the reset signal RESET to the control terminal of the reset switch SWRT. The first terminal of the reset switch SWRT is connected to the first terminal of the charging capacitor Cdy. The second terminal of the reset switch SWRT is grounded.

As shown in FIG. 6, a sum of the duty cycle of each of the plurality of waveforms of the switching signals DUTY1, the duty cycle of each of the plurality of waveforms of the switching signals DUTY2 and the duty cycle of each of the plurality of waveforms of the switching signals DUTY3 is 100%. In addition, a time interval during which the switching signal DUTY1 is at a high level, a time interval during which the switching signal DUTY2 is at a high level and a time interval during which the switching signal DUTY3 is at a high level are not overlapped with each other. Therefore, even if only the single inductor L is disposed, the multi-output power converter of the present disclosure is capable of supplying different amounts of power respectively to the plurality of loads.

In conclusion, the present disclosure provides the multi-output power converter. The present disclosure provides the multi-output power converter. The multi-output power converter of the present disclosure includes the plurality of output terminals that are connected respectively to the plurality of loads. In the multi-output power converter of the present disclosure, the signal duty distributing circuit appropriately distributes the duty cycles of the plurality of switching signals outputted to the plurality of output switches. Therefore, even if only the single inductor is disposed, the multi-output power converter of the present disclosure effectively achieves an effect of supplying different amounts of power to the plurality of loads without greatly expanding circuit components.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A multi-output power converter having a single inductor, comprising:

a high-side switch, wherein a first terminal of the high-side switch is coupled with an input voltage;

a low-side switch, wherein a first terminal of the low-side switch is connected to a second terminal of the high-side switch, a second terminal of the low-side switch is grounded, and a node between the first terminal of the low-side switch and the second terminal of the high-side switch is connected to a first terminal of the inductor;

a control circuit connected to a control terminal of the high-side switch and a control terminal of the low-side switch, and configured to control the high-side switch and the low-side switch;

a plurality of output switches, wherein a first terminal of each of the plurality of output switches is connected to a second terminal of the inductor;

a signal duty distributing circuit connected to a second terminal and a control terminal of each of the plurality of output switches, wherein the signal duty distributing circuit sets duty cycles of a plurality of waveforms of a plurality of switching signals according to a plurality of output voltages respectively from the second terminals of the plurality of output switches, and the signal duty distributing circuit outputs the plurality of switching signals respectively to the control terminals of the plurality of output switches;

a plurality of voltage divider circuits, wherein input terminals of the plurality of voltage divider circuits are respectively connected to the second terminals of the plurality of output switches; and a plurality of error amplifiers, wherein first input terminals of the plurality of error amplifiers are respectively connected to output terminals of the plurality of voltage divider circuits, second input terminals of the plurality of error amplifiers are respectively coupled with a plurality of reference voltages, and the plurality of error amplifiers are configured to respectively output a plurality of error amplified signals; and wherein the signal duty distributing circuit includes:

a plurality of voltage-current converting circuits having input terminals that are respectively connected to the output terminals of the plurality of error amplifiers, and configured to respectively convert voltages of the plurality of error amplified signals into a plurality of error amplified currents; and a duty cycle setting circuit including:

a charging resistor, wherein a first terminal of the charging resistor is connected to output terminals of the plurality of voltage-current converting circuits, and a second terminal of the charging resistor is grounded;

a charging capacitor, wherein a first terminal of the charging capacitor is connected to the output terminals of the plurality of voltage-current converting circuits, and a second terminal of the charging capacitor is grounded;

a first comparator, wherein a first input terminal of the first comparator is connected to the first terminal of the charging capacitor, and a second input terminal of the first comparator is connected to the output terminal of one of the plurality of error amplifiers;

a second comparator, wherein a first input terminal of the second comparator is connected to the first terminal of the charging capacitor, and a second input terminal of the second comparator is connected to the first terminal of the charging resistor; and a switching signal generator circuit configured to output the plurality of switching signals respectively to the control terminals of the plurality of output switches according to a plurality of comparing signals from an output terminal of the first comparator and an output terminal of the second comparator.

2. The multi-output power converter according to claim 1, wherein the second terminals of the plurality of output switches are respectively connected to first terminals of a plurality of output capacitors, and a second terminal of each of the plurality of output capacitors is grounded.

3. The multi-output power converter according to claim 1, further comprising:

a plurality of compensation resistors, wherein first terminals of the plurality of compensation resistors are respectively connected to the output terminals of the plurality of error amplifiers and the output terminals of the plurality of voltage-current converting circuits; and a plurality of compensation capacitors, wherein first terminals of the plurality of compensation capacitors are respectively connected to second terminals of the plurality of compensation resistors, and a second terminal of each of the plurality of compensation capacitors is grounded.

4. The multi-output power converter according to claim 1, wherein each of the plurality of voltage divider circuits includes a first voltage dividing resistor and a second voltage dividing resistor, and first terminals of the first voltage dividing resistors of the plurality of voltage divider circuits are respectively connected to the second terminals of the plurality of output switches;

wherein, in each of the plurality of voltage divider circuits, a second terminal of the first voltage dividing resistor is connected to a first terminal of the second voltage dividing resistor, a second terminal of the second voltage dividing resistor is grounded, and a first terminal of the second voltage dividing resistor is used as a feedback node;

wherein the feedback nodes of the plurality of voltage divider circuits are respectively connected to the first input terminals of the plurality of error amplifiers.

5. The multi-output power converter according to claim 1, wherein the switching signal generator circuit includes:

a first flip-flop, wherein a first input terminal of the first flip-flop is connected to the output terminal of the first comparator, an output terminal of the first flip-flop is connected to the control terminal of one of the plurality of output switches, and an inverting output terminal of the first flip-flop is connected to the control terminal of another of the plurality of output switches;

a clock circuit, wherein an input terminal of the clock circuit is connected to the output terminal of the second comparator, and a first output terminal of the clock circuit is connected to a second input terminal of the first flip-flop; and a reset switch, wherein a control terminal of the reset switch is connected to a second output terminal of the clock circuit, a first terminal of the reset switch is connected to the first terminal of the charging capacitor, and a second terminal of the reset switch is grounded.

6. The multi-output power converter according to claim 1, wherein the duty cycle setting circuit further includes:

a first current mirror circuit including a first transistor, a second transistor and a third transistor, wherein a first terminal of the first transistor is connected to a first terminal of the second transistor and a first terminal of the third transistor, a second terminal and a control terminal of the first transistor are connected to the output terminal of one of the plurality of voltage-current converting circuits, a control terminal of the second transistor and a control terminal of the third transistor, a second terminal of the second transistor is connected to the first terminal of the charging resistor, and a second terminal of the third transistor is connected to the first terminal of the charging capacitor.

7. The multi-output power converter according to claim 6, wherein the duty cycle setting circuit further includes:

a second current mirror circuit including a fourth transistor, a fifth transistor and a sixth transistor, wherein a first terminal of the fourth transistor is connected to a first terminal of the fifth transistor and a first terminal of the sixth transistor, a second terminal and a control terminal of the fourth transistor are connected to the output terminal of another of the plurality of voltage-current converting circuits, a control terminal of the fifth transistor and a control terminal of the sixth transistor, a second terminal of the fifth transistor is connected to the first terminal of the charging resistor, and a second terminal of the sixth transistor is connected to the first terminal of the charging capacitor.

8. The multi-output power converter according to claim 1, wherein the duty cycle setting circuit further includes:

a third comparator, wherein a first input terminal of the third comparator is connected to the first terminal of the charging capacitor, and a second input terminal of the third comparator is connected to the first terminal of the charging resistor.

9. The multi-output power converter according to claim 8, wherein the plurality of output switches includes a first output switch, a second output switch and a third output switch, and the switching signal generator circuit includes:

a first flip-flop, wherein an output terminal of the first flip-flop is connected to a control terminal of the third output switch;

a second flip-flop, wherein a first input terminal of the second flip-flop is connected to an output terminal of the first comparator, a second input terminal of the second flip-flop is connected to an output terminal of the second comparator, and an output terminal of the second flip-flop is connected to a control terminal of the second output switch;

a third flip-flop, wherein a first input terminal of the third flip-flop is connected to the output terminal of the second comparator, and an output terminal of the third flip-flop is connected to a control terminal of the first output switch;

a clock circuit, wherein an input terminal of the clock circuit is connected to an output terminal of the third comparator, a first input terminal of the clock circuit is connected to a first input terminal of the first flip-flop and a second input terminal of the third flip-flop, and a second input terminal of the first flip-flop is connected to the output terminal of the first comparator; and a reset switch, wherein a control terminal of the reset switch is connected to a second output terminal of the clock circuit, a first terminal of the reset switch is connected to the first terminal of the charging capacitor, and a second terminal of the reset switch is grounded.

10. The multi-output power converter according to claim 8, wherein the duty cycle setting circuit further includes:

a first current mirror circuit including a first transistor, a second transistor and a third transistor, wherein a first terminal of the first transistor is connected to a first terminal of the second transistor and a first terminal of the third transistor, a second terminal and a control terminal of the first transistor are connected to the output terminal of one of the plurality of voltage-current converting circuits, a control terminal of the second transistor and a control terminal of the third transistor, a second terminal of the second transistor is connected to the first terminal of the charging resistor, and a second terminal of the third transistor is connected to the first terminal of the charging capacitor.

11. The multi-output power converter according to claim 10, wherein the duty cycle setting circuit further includes:

a second current mirror circuit including a fourth transistor, a fifth transistor and a sixth transistor, wherein a first terminal of the fourth transistor is connected to a first terminal of the fifth transistor and a first terminal of the sixth transistor, a second terminal and a control terminal of the fourth transistor are connected to the output terminal of another of the plurality of voltage-current converting circuits, the control terminal of the fifth transistor and the control terminal of sixth transistor, a second terminal of the fifth transistor is connected to the first terminal of the charging resistor, and a second terminal of the sixth transistor is connected to the first terminal of the charging capacitor.

12. The multi-output power converter according to claim 11, wherein the duty cycle setting circuit further includes:

a third current mirror circuit including a seventh transistor, an eighth transistor and a ninth transistor, wherein a first terminal of the seventh transistor is connected to a first terminal of the eighth transistor and a first terminal of the ninth transistor, a second terminal and a control terminal of the seventh transistor are connected to the output terminal of the other of the plurality of voltage-current converting circuits, a control terminal of the eighth transistor and a control terminal of the ninth transistor, a second terminal of the eighth transistor is connected to the first terminal of the charging resistor, and a second terminal of the ninth transistor is connected to the first terminal of the charging capacitor.

13. The multi-output power converter according to claim 9, further comprising:

a plurality of buffers, wherein an input terminal of one of the plurality of buffers is connected to the output terminal of the first flip-flop, another of the plurality of buffers is connected to the output terminal of the second flip-flop, yet another of the plurality of buffers is connected to the output terminal of the third flip-flop, and output terminals of the plurality of buffers are respectively connected to the control terminals of the plurality of output switches.

* * * * *